United States Patent
Yang

(10) Patent No.: US 9,340,145 B2
(45) Date of Patent: May 17, 2016

(54) MOVING FRAME STRUCTURE OF HAND PULLER

(71) Applicant: Fang-Lin Yang, Taichung (TW)

(72) Inventor: Fang-Lin Yang, Taichung (TW)

( * ) Notice: Subject to any disclaimer, the term of this patent is extended or adjusted under 35 U.S.C. 154(b) by 194 days.

(21) Appl. No.: 14/164,554

(22) Filed: Jan. 27, 2014

(65) Prior Publication Data

US 2015/0210203 A1    Jul. 30, 2015

(51) Int. Cl.
*B65H 75/38* (2006.01)
*B60P 7/08* (2006.01)

(52) U.S. Cl.
CPC ..................................... *B60P 7/083* (2013.01)

(58) Field of Classification Search
CPC ... B60P 7/083; B60P 7/0846; Y10T 24/2175; B65H 54/585; B65H 2701/375; A44B 11/125
USPC ............. 242/388.4, 388.3, 388.2, 388.1, 388; 24/68 R, 69 ST, 69 CT, 71 ST; 254/213, 254/217, 218, 225
See application file for complete search history.

(56) References Cited

U.S. PATENT DOCUMENTS

| 7,350,768 | B1* | 4/2008 | Chang | B25B 25/00 24/70 ST |
| 8,721,240 | B1* | 5/2014 | Wu | B60P 7/083 410/121 |
| 2011/0041300 | A1* | 2/2011 | Lu | B60P 7/083 24/68 CD |

FOREIGN PATENT DOCUMENTS

TW          M320549         10/2007

* cited by examiner

*Primary Examiner* — William A Rivera
(74) *Attorney, Agent, or Firm* — Rosenberg, Klein & Lee

(57) ABSTRACT

A moving frame structure of a hand puller is used for driving a ratchet to rotate with a turning of two side panels when a pressing portion is placed into a ratchet gear. When the pressing portion at the two side panels is separated from the ratchet gear, the two side panels are swung with respect to the axis of the rotating shaft. When the two side panels are moved to a circular arc surface and separated from the circumferential surface of the rotating shaft and a notch is aligned precisely with the rotating shaft, the pressing portion is placed into the ratchet gear to achieve a blocking effect. By pulling the fastening member backward, the pressing portions on both sides are retracted and separated from the ratchet gear of the ratchet completely, so that the rotating shaft can be withdrawn from the socketing hole through the notch.

6 Claims, 13 Drawing Sheets

MOVING FRAME STRUCTURE OF HAND PULLER

FIELD OF THE INVENTION

The present invention relates to a moving frame structure of a hand puller, in particular to a moving frame of a fixed frame of a hand puller.

BACKGROUND OF THE INVENTION

As disclosed in R.O.C. Pat. No. M320549, a detachable rope puller (I) comprises a moving frame (40) mounted onto a fixed frame (10), and the moving frame (40) is pulled and a control board (44) is provided for controlling a ratchet (30) to rotate in a single direction to drive a rotating shaft (20) to rotate and rewind a strap.

The moving frame (40) is a flap (41) having a tracking hole (42) aligned precisely with the rotating shaft (20), and a lock plate (50) with a socketing hole (52) sheathed on the rotating shaft (20) and pivotally coupled to the rotating shaft (20), wherein the flap (41) is not separated from the pivoting position of the rotating shaft (20). In addition, the lock plate (50) is fixed onto the flap (41) by a rivet (51), and the lock plate (50) is not fixed between an end of the rotating shaft (20) and the flap (41) or the rotating shaft (20), so that the flap (51) can be expanded outwardly towards the axial direction of the rotating shaft (20) (as shown in FIG. 6) and separated from the rotating shaft (20), so that the flap (41) can be separated from rotating shaft (20) through the position of the notch (421) of the flap (41).

Although the flap (41) has the characteristic of being separated from the rotating shaft (20) effectively, the installation of the lock plate (50) onto the moving frame (40) incurs a greater cost and takes a longer manufacturing time than the conventional hand puller structure. If the lock plate (50) is expanded outwardly, bent and deformed, the socketing hole (52) of the lock plate (50) may be separated axially from the rotating shaft (20) easily, so that the flap (41) may be separated from the rotating shaft (20) through the notch (421) of the flap (41) easily when the moving frame (40) is turned. As a result, the winding of the strap may be interrupted frequently, and the efficiency of winding the strap is very low.

Therefore, it is a main subject of the present invention to provide a hand puller capable of maintaining the moving frame (40) to be detachable from the rotating shaft (20) of the fixed frame (10) and overcoming the aforementioned problems caused by the lock plate (50).

SUMMARY OF THE INVENTION

In view of the aforementioned shortcomings of the conventional, it is a primary objective of the present invention to overcome the shortcomings by providing a moving frame structure of a hand puller operated together with a fastening member to abut a ratchet gear of a ratchet, and a side panel having a socketing hole is provided for fixing a rotating shaft of a fixed frame at a pivoting position without requiring an additional positioning element for the positioning effect, and the rotating shaft is fixed into the socketing hole, so as to prevent the frequent interrupt occurred during the process of winding the strap and improve the poor efficiency of winding the strap.

A secondary objective of the present invention is to provide a housing protruded from the periphery of a socketing hole of a side panel of a moving frame, and the housings of the two side panels block both ends of a rotating shaft to prevent the two side panels from falling off from the rotating shaft accidentally.

To achieve the aforementioned objective, the present invention provides a moving frame structure of a hand puller operated together with a fixed frame of the hand puller to wind a strap, and an end of the fixed frame being pivotally coupled to a rotating shaft, and the rotating shaft having a ratchet installed at the fixed frame, and the fixed frame being blocked by a stop member installed in a ratchet gear of the ratchet, and the moving frame structure being used for driving the rotating shaft to rotate in a single direction when the strap is wound, and the moving frame structure comprising two side panels, a handle and a fastening member, wherein the two side panels are installed symmetrically and coupled to both ends of the handle from the same end, and each side panel has a socketing hole formed at a position away from an end of the handle and sheathed on the rotating shaft, and the fastening member in the two side panels is installed between the handle and the two socketing holes, and the fastening member has a pressing portion formed separately on both sides towards an edge of the socketing hole for placing the ratchet gear of the ratchet, and the fastening member disposed between the two side panels is abutted by an elastic member in a direction towards the ratchet gear of the ratchet; each socketing hole at the extending direction of the side panel has a diameter greater than the shaft diameter of the rotating shaft, and each socketing hole at the bottom of the socketing hole has a notch with a diameter smaller than the diameter of the socketing hole, and the notch has a diameter greater than the shaft diameter of the rotating shaft, and the socketing hole at an inner edge away from a side of the fastening member has a curvature corresponding to a circular arc surface of the circumference of the shaft, and the circular arc surface is coupled to the notch and a stop edge is formed at the connection position, and the stop edge is provided for restricting the circumferential surface of the rotating shaft from separating the circular arc surface.

Each of the first side panels has a housing disposed on an outer side of the first side panel, and the housing is protruded from the periphery of the socketing hole, and the outer side of the first side panel covers the socketing hole.

DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
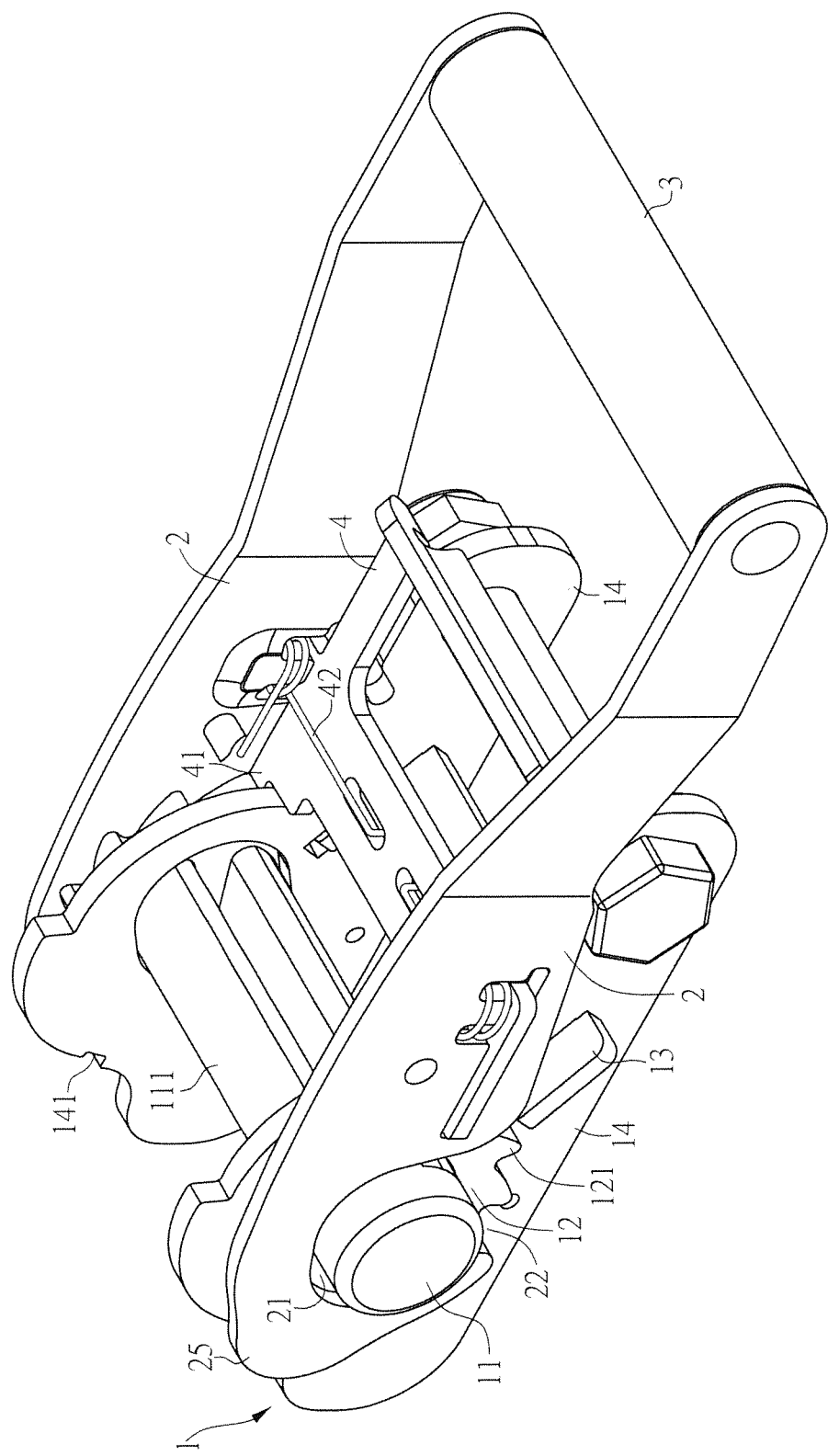
FIG. 1 is a perspective view of a moving frame and a fixed frame assembled with each other according to a first preferred embodiment of the present invention.
Figure 2:
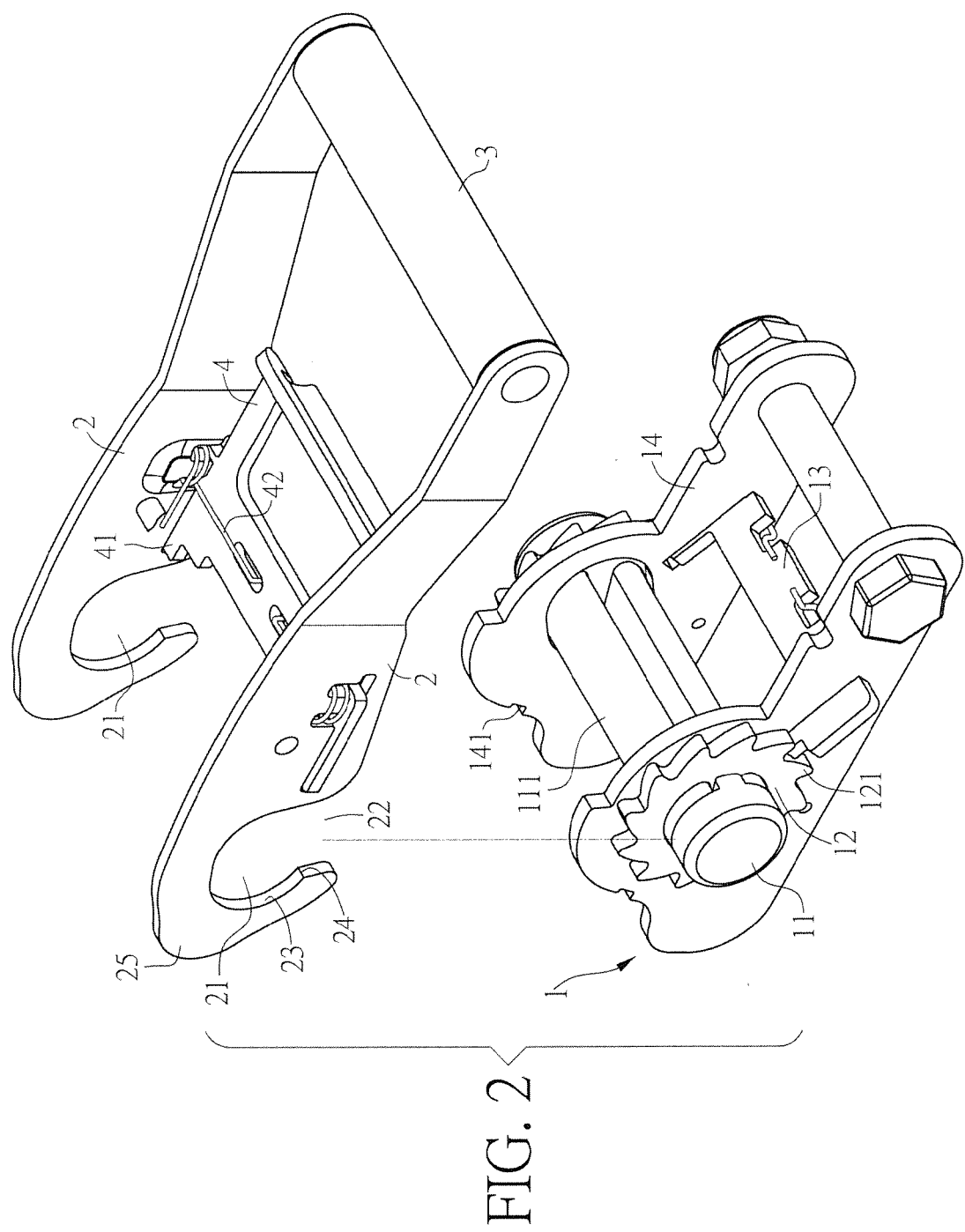
FIG. 2 is a perspective view of a moving frame and a fixed frame separated from each other according to the first preferred embodiment of the present invention.
Figure 3:
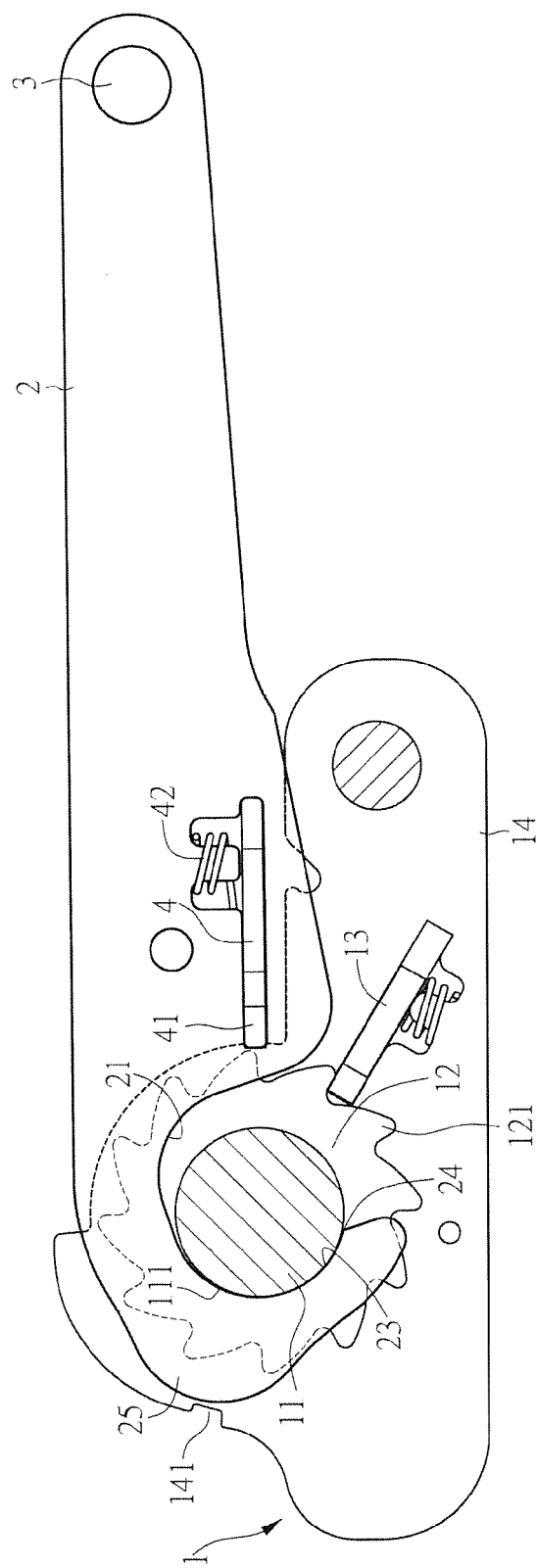
FIG. 3 is a side view of a moving frame and a fixed frame assembled with each other according to the first preferred embodiment of the present invention.

With reference to FIGS. 1 to 3 for a moving frame structure of a hand puller in accordance with the first preferred embodiment of the present invention, a fixed frame 1 of the hand puller is used for an operation of winding a strap, and an end of the fixed frame 1 is pivotally coupled to a rotating shaft 11, and the rotating shaft 11 has a ratchet 12 installed on an inner side (or an outer side) of the fixed frame 1, and the fixed frame 1 is blocked by placing a stop member 13 into a ratchet gear 121 of the ratchet 12, and the structure of the moving frame is provided for driving the rotating shaft 11 to rotate in a single direction when the strap is wound.

In the structure of the moving frame of the present invention as shown in FIGS. 1 to 3, the moving frame comprises two first side panels 2, a handle 3 and a fastening member 4.

In FIGS. 2 and 3, the two first side panels 2 are installed symmetrically to each other, and coupled to both ends of the handle 3 respectively at the same end, and each first side panel 2 has a socketing hole 21 formed at a position away from an end of the handle 3, and the socketing hole 21 of this preferred embodiment is formed on an outer side of the fixed frame 1 and sheathed on the rotating shaft 11, and the socketing hole 21 can be moved with respect to the rotating shaft 11, so that the two side panels together with the latching portion 41 of the fastening member 4 are embedded into the ratchet gear of the ratchet and separated from one of the positions of the ratchet gear of the ratchet.

The fastening member 4 in the two first side panels 2 is installed between the handle 3 and the two socketing holes 21, and the fastening member 4 has a pressing portion 41 disposed separately on both sides of an end facing the socketing hole 21, and the pressing portion 41 may be placed in the ratchet gear 121 of the ratchet 12, and the fastening member 4 between the two side panels 2 is abutted by an elastic member 42 to move in a direction towards the ratchet gear 121 of the ratchet 12.

Figure 5:
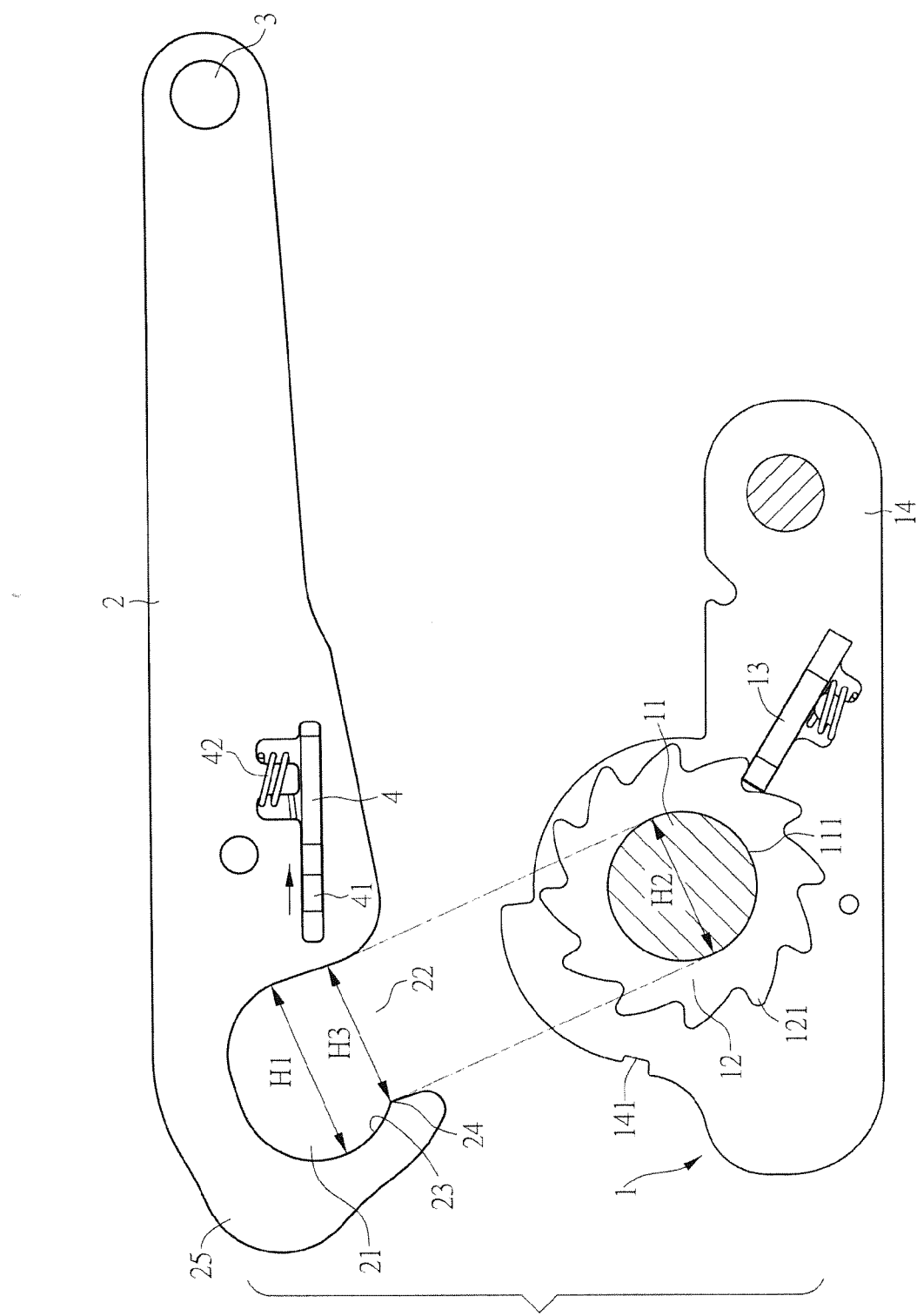
FIG. 5 is a side view of sheathing a moving frame on a rotating shaft by aligning a notch at the bottom of a socketing hole with the rotating shaft in accordance with the first preferred embodiment of the present invention.

In FIGS. 2, 3 and 5, each of the socketing holes 21 along the extending direction of the first side panel 2 has a diameter $H_1$ greater than the shaft diameter $H_2$ of the rotating shaft 11, and a notch 22 is formed at the bottom of the socketing hole 21, and the notch 22 has a diameter $H_3$ smaller than the diameter $H_1$ of the socketing hole 21, and the diameter $H_3$ of the notch 22 is greater than the shaft diameter $H_2$ of the rotating shaft 11, and the socketing hole 21 has a circular arc surface 23 disposed at an inner edge away from a side of the fastening member 4, and the circular arc surface 23 has a curvature corresponding to the circumference of the shaft 12, and the circular arc surface 23 is coupled to the notch 22 and has a stop edge 24 formed at the connection position and provided for restricting the circumferential surface 111 of the rotating shaft 11 from separating from the circular arc surface 23.

In FIGS. 2 and 3, the fixed frame 1 of the preferred embodiment further comprises two second side panels 14, and the rotating shaft 11 is pivotally coupled to an end of the two second side panels 14, and the rotating shaft 11 has the ratchet 12 installed on an inner side of the two second side panels 14, and the stop member 13 between the two second side panels 14 is placed in the ratchet gear 121 of the ratchet 12 to achieve a blocking effect.

Figure 4:
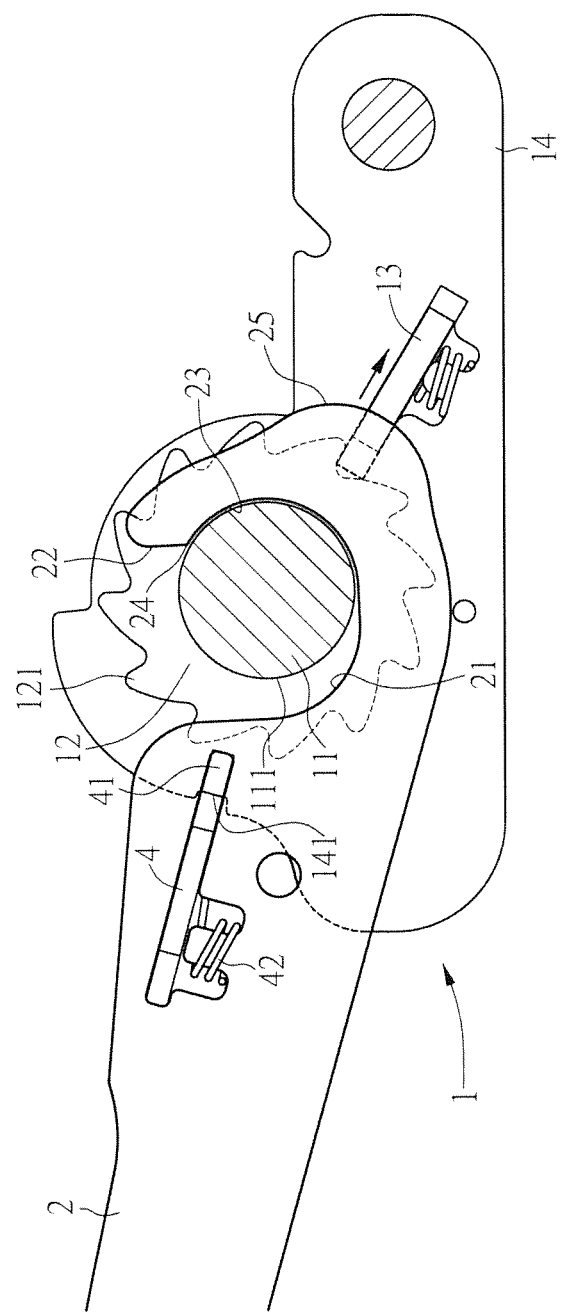
FIG. 4 is a side view of turning and moving a moving frame to a quick strap release position in accordance with the first preferred embodiment of the present invention.

In FIGS. 2 and 4, each first side panel 2 has a protrusion 25 disposed at an end of the socketing hole 21, and when the two first side panels 2 are swung to a position of the protrusion 25 to abut the stop member 13 to separate from the ratchet gear 121 of the ratchet 12 completely, the two second side panels 14 have a positioning groove 141 formed at the pressing portion 41 of the fastening member 4 and provided for setting the fastening member 4 to an edge of the pressing portion 41, so that the rotating shaft 11 can be released from the blocking by the stop member 13 to achieve the effect of releasing the strap quickly.

When it is necessary to install the moving frame of the present invention onto the fixed frame in order to use the hand puller, a user may hold the handle 3 by a hand as shown in FIG. 5 and pulls the fastening member 4 backward, and then aligns the notch 22 precisely with the rotating shaft 11 to sheath the socketing hole 21 of the two first side panels 2 on the rotating shaft 11.

Figure 6:
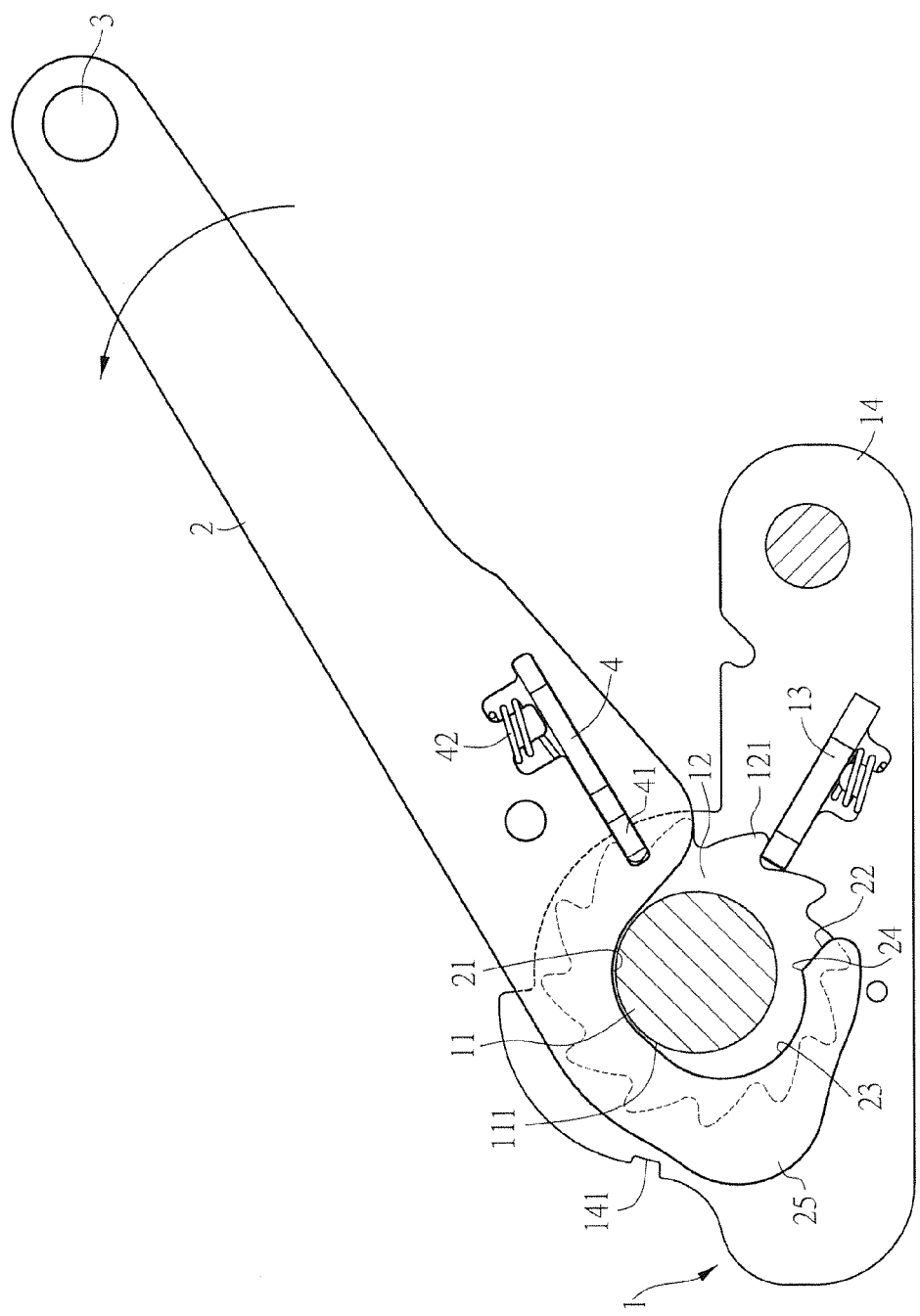
FIG. 6 is a side view of turning a moving frame to drive a rotating shaft to rotate in accordance with the first preferred embodiment of the present invention.

When it is necessary to rotate the ratchet to wind the strap, the user may push the two side panels 2 forward as shown in FIG. 6, so that the pressing portion 41 of the fastening member 4 is placed into the ratchet gear 121 of the ratchet 12. Now, the pressing portion 41 of the fastening member 4 can be turned reciprocally with the two side panels 2 to drive the ratchet 12 to rotate, so as to wind the strap.

Figure 7:
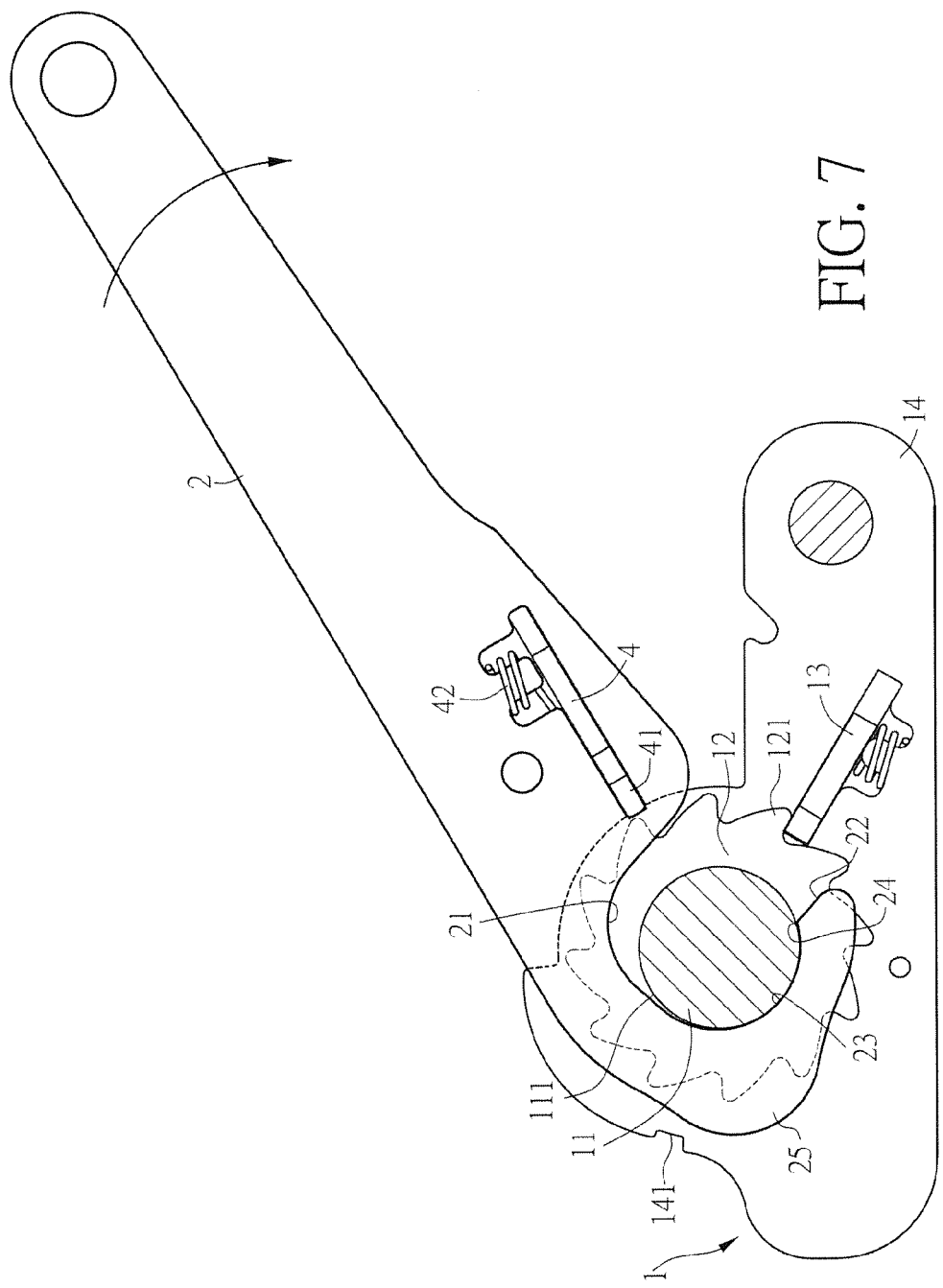
FIG. 7 is a side view of pulling a moving frame backward to resume its initial position in accordance with the first preferred embodiment of the present invention.

In the process of driving the ratchet 12 to rotate by the fastening member 4, if the two side panels 2 are turned to resume to their initial positions, the two side panels 2 may be pulled backward as shown in FIG. 7, so that the pressing portion 41 of the fastening member 4 is separated from the ratchet gear 121 of the ratchet 12, and the circumferential surface 111 of the rotating shaft 11 in the socketing hole 21 abuts the circular arc surface 23. Now, the two side panels 2 are swung with respect to the axis of the rotating shaft 11, and the stop edge 24 is provided for restricting the circumferential surface 111 of the rotating shaft 11 from separating from the circular arc surface 23, so as to resume the two side panels 2 to their initial positions.

In the process of pushing the two side panels 2 forward or backward, the two side panels 2 are moved to the circular arc surface 23 of the socketing hole 21 and separated from the circumferential surface 11 of the rotating shaft 11, and the notch 22 is aligned precisely with the rotating shaft 11. Although the rotating shaft 11 is not blocked by the stop edge 24 at this moment, the pressing portion 41 of the fastening member 4 is moved together with the two side panels 2 into the ratchet gear 121 of the ratchet 12 to achieve the blocking effect. Now, the rotating shaft 11 still cannot be withdrawn from the socketing hole 23 through the notch 22.

Figure 8:
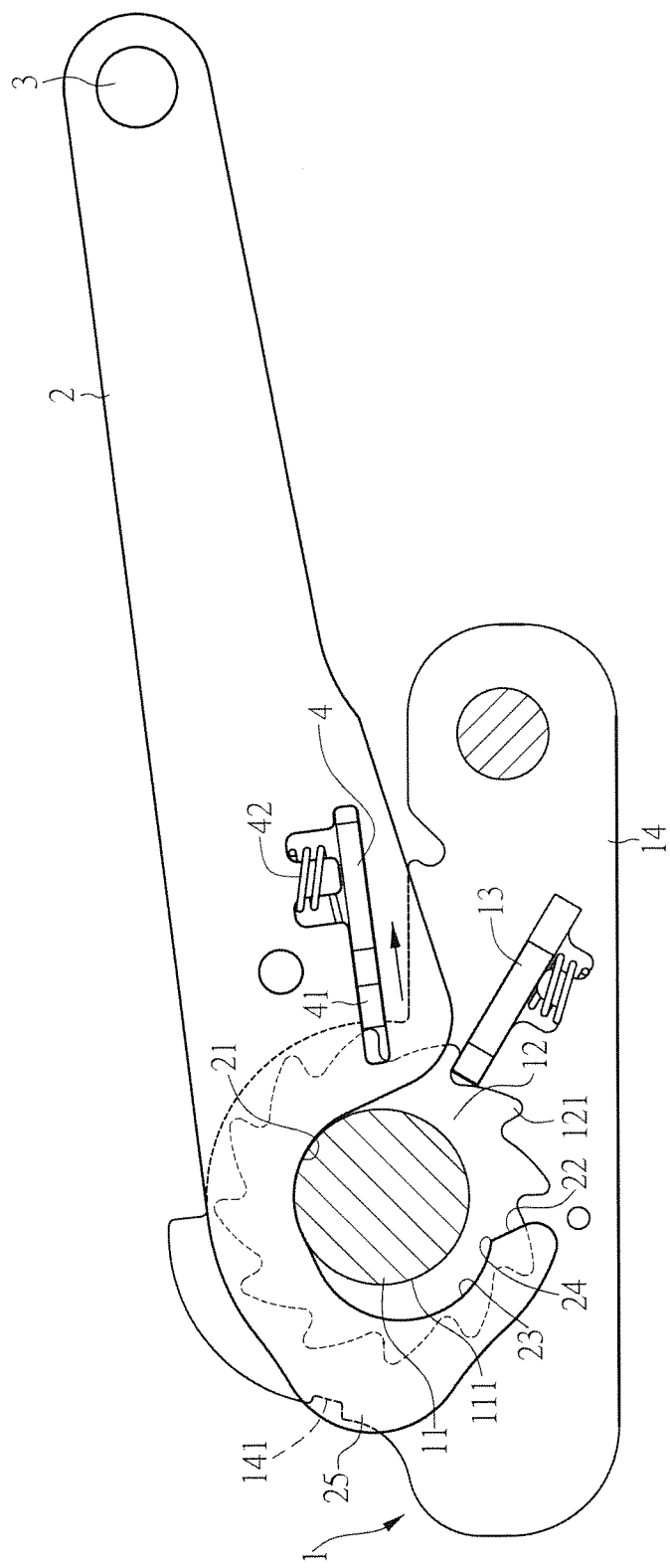
FIG. 8 is a side view of pulling a fastening member backward to move a moving frame forward in order to align a rotating shaft precisely with a notch in accordance with the first preferred embodiment of the present invention.
Figure 9:
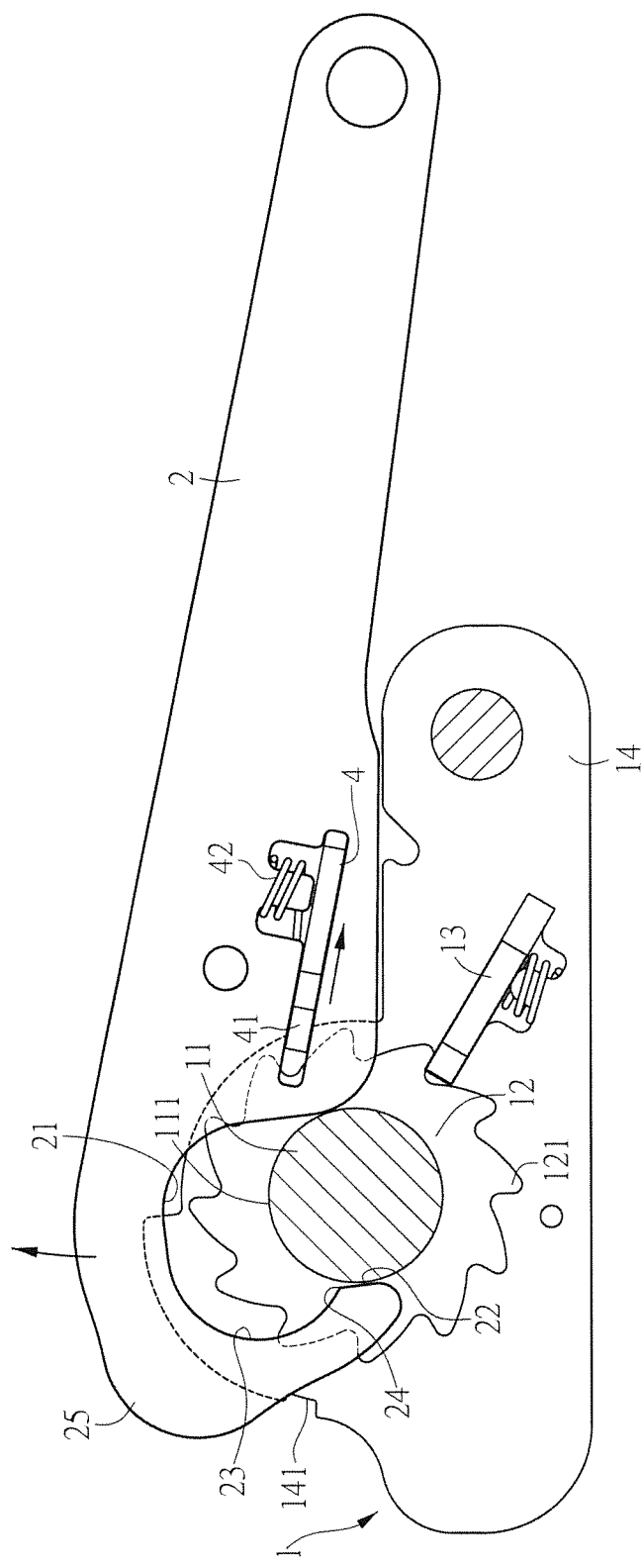
FIG. 9 is a side view of pulling a fastening member backward and aligning a rotating shaft precisely with a notch in order to separate a moving frame from a fixed frame in accordance with the first preferred embodiment of the present invention.

If a user wants to lift the moving frame and separate the moving frame from the fixed frame, the user may pull the fastening member 4 backward as shown in FIG. 8, so that the pressing portions 41 on both sides are retracted and separated from the ratchet gear 121 of the ratchet 12 completely, and the rotating shaft 11 may be withdrawn from the socketing hole 23 through the notch 22. Now, the moving frame can be lifted to separate from the fixed frame 1 as shown in FIG. 9.

In view of the description above, the present invention has the following advantages. Compared with the conventional hand puller structure, the first side panel 2 of the present invention is equivalent to the flap (51) of the conventional hand puller, and the first side panel 2 has the socketing hole 21 and the fastening member 4 to achieve the effect of fixing the fixed frame 1 at a pivoting position without requiring the installation of the lock plate (50), so as to save the cost of the lock plate (50) and assure the effect of positioning the rotating shaft in the socketing hole (unless the structure of the first side panel 2, fastening member 4 or ratchet 12 is damaged), and prevent the frequent interrupt of winding the strap or a low efficiency of the winding operation of the strap.

Figure 10:
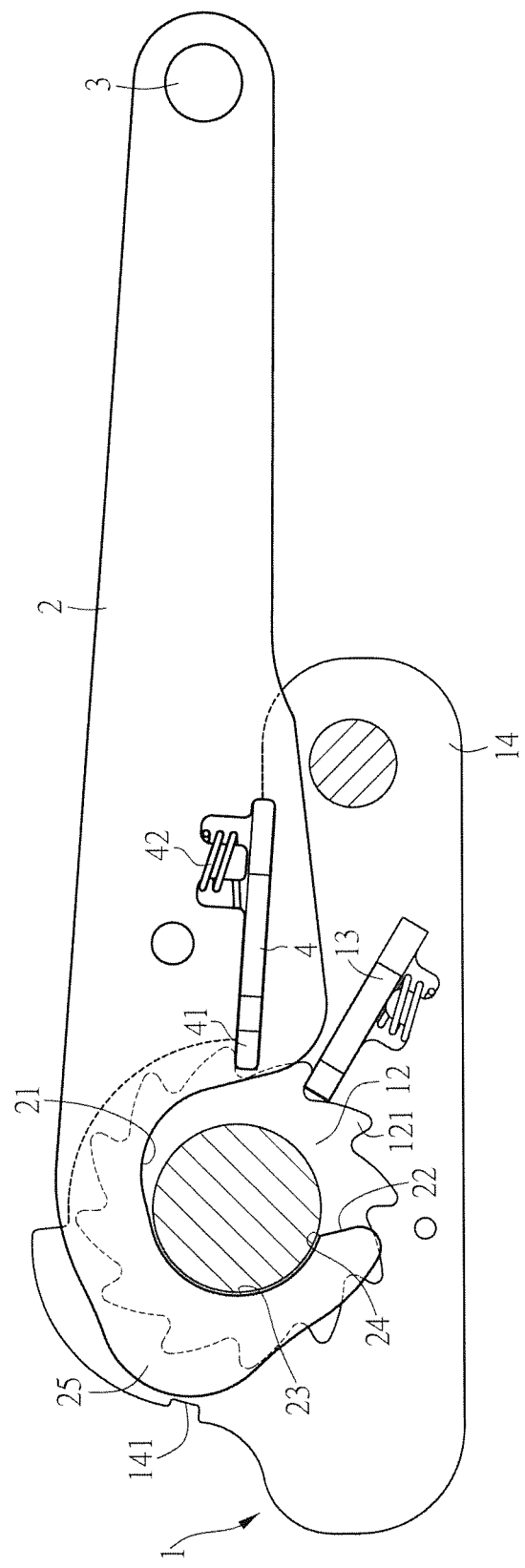
FIG. 10 is a side view of a moving frame and a fixed frame assembled with each other in accordance with the second preferred embodiment of the present invention.

Of course, the present invention may have many other embodiments with a major modification from one another. With reference to FIG. 10 for the second preferred embodiment of the present invention, when the socketing hole 21 of the two side panels 2 is sheathed on the rotating shaft 11, the elastic force of the elastic member 42 is exerted onto the fastening member 4, so that the pressing portions 41 on both sides are normally embedded into the ratchet gear 121 of the ratchet 12, and the circular arc surface 23 of the socketing hole 21 abuts the rotating shaft 11, and the stop edge 24 restricts the circumferential surface 111 of the rotating shaft 12 from separating from the circular arc surface 23.

In the status of the circumferential surface 111 of the rotating shaft 11 abutting the circular arc surface 23 in the socketing hole 21, the fastening member 4 of the first preferred embodiment is abutted by the elastic member 42, and the pressing portion 41 is not placed in the ratchet gear 121 of the ratchet 12, so that the space for pushing/pulling the two side panels 2 forward/backward is reserved. Similarly, in the status of the circumferential surface 111 of the rotating shaft 11 abutting the circular arc surface 23 in the socketing hole 21, the pressing portion 41 of the fastening member 4 is abutted by the elastic member 42 to extend downwardly into the ratchet gear 121 of the ratchet 12. Now, the two side panels 2 does not have the space for being pushed/pulled forward/backward, and the two side panels 2 are turned to drive the ratchet 12 to rotate directly, and when the two side panels 2 are turned in a direction to resume their initial positions, the pressing portion 41 of the fastening member 4 falls along the gear back of the ratchet gear 121 to turn the two side panels 2 directly, so as to achieve the same effect of winding the strap as the first preferred embodiment.

In this preferred embodiment, the pressing portion 41 of the fastening member 4 is abutted by the elastic member 42 to extend downwardly into the ratchet gear 121 of the ratchet 12. Compared with the first preferred embodiment, the stroke of the fastening member 4 is extended in order to extend the pressing portion 41 into the ratchet gear 121. It is noteworthy that it is not necessary to extend the stroke of the fastening member, but increase the width of the ratchet 12, so that the ratchet gear can approach in a direction towards the pressing portion 41 to achieve the same effect.

Figure 11:
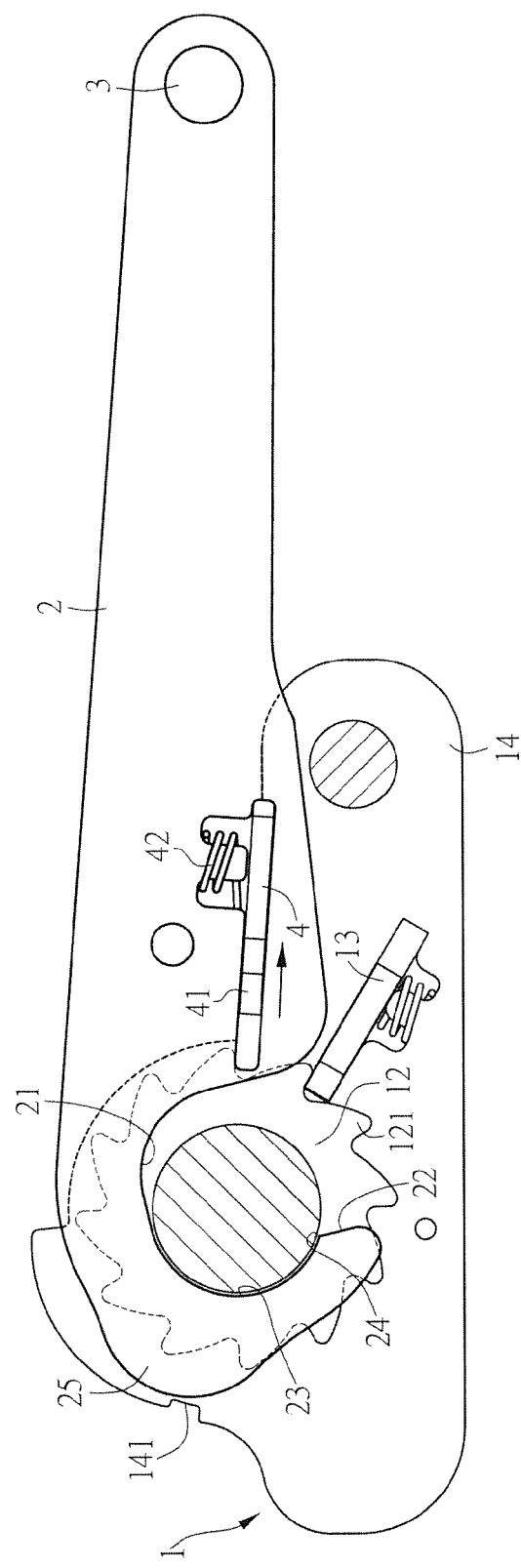
FIG. 11 is a side view of a fastening member of a moving frame being pulled backward in accordance with a second preferred embodiment of the present invention.

If the user wants to lift the moving frame and separate the moving frame from the fixed frame, the user may pull the fastening member 4 backward as shown in FIG. 11, so that the pressing portions 41 on both sides can be retracted from the ratchet gear 121 of the ratchet 12 completely in order to reserve a space for pushing the side panel 2 forward, and when the side panel 2 is pushed forward, the circumferential surface 111 of the rotating shaft 11 is separated from the circular arc surface 23 of the socketing hole 21, and the fastening member 4 is still pulled backward and the pressing portion 41 is still separated from the ratchet gear 121 of the ratchet 12 (which is in the same status of the first preferred embodiment as shown in FIG. 8), and the rotating shaft 11 may be withdrawn from the socketing hole 23 through the notch 22, and the moving frame can be lifted and separated from the fixed frame 1 in the same way as described in the first preferred embodiment.

Figure 12:
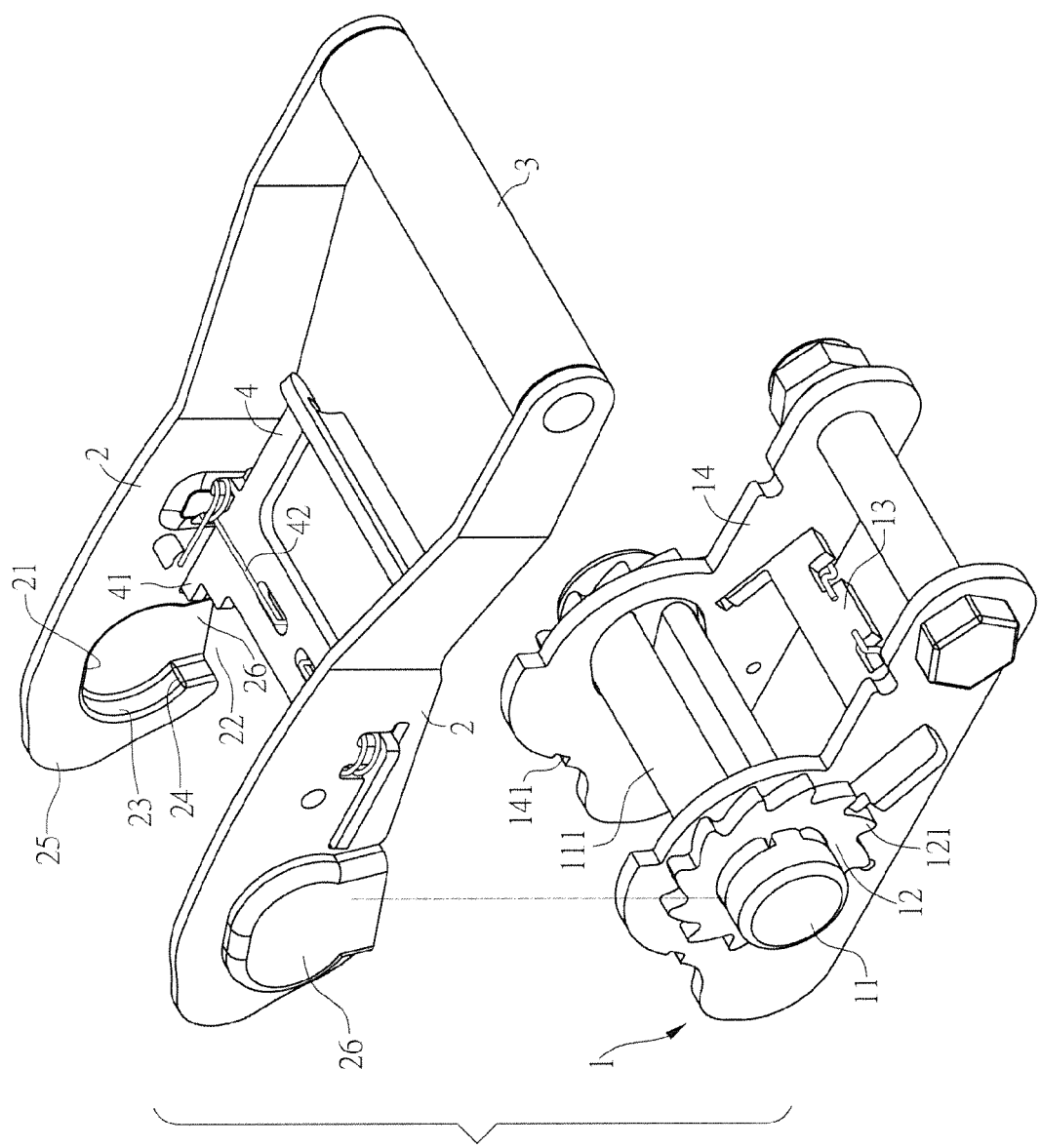
FIG. 12 is a perspective view of a moving frame and a fixed frame detached from each other in accordance with the third preferred embodiment of the present invention.
Figure 13:
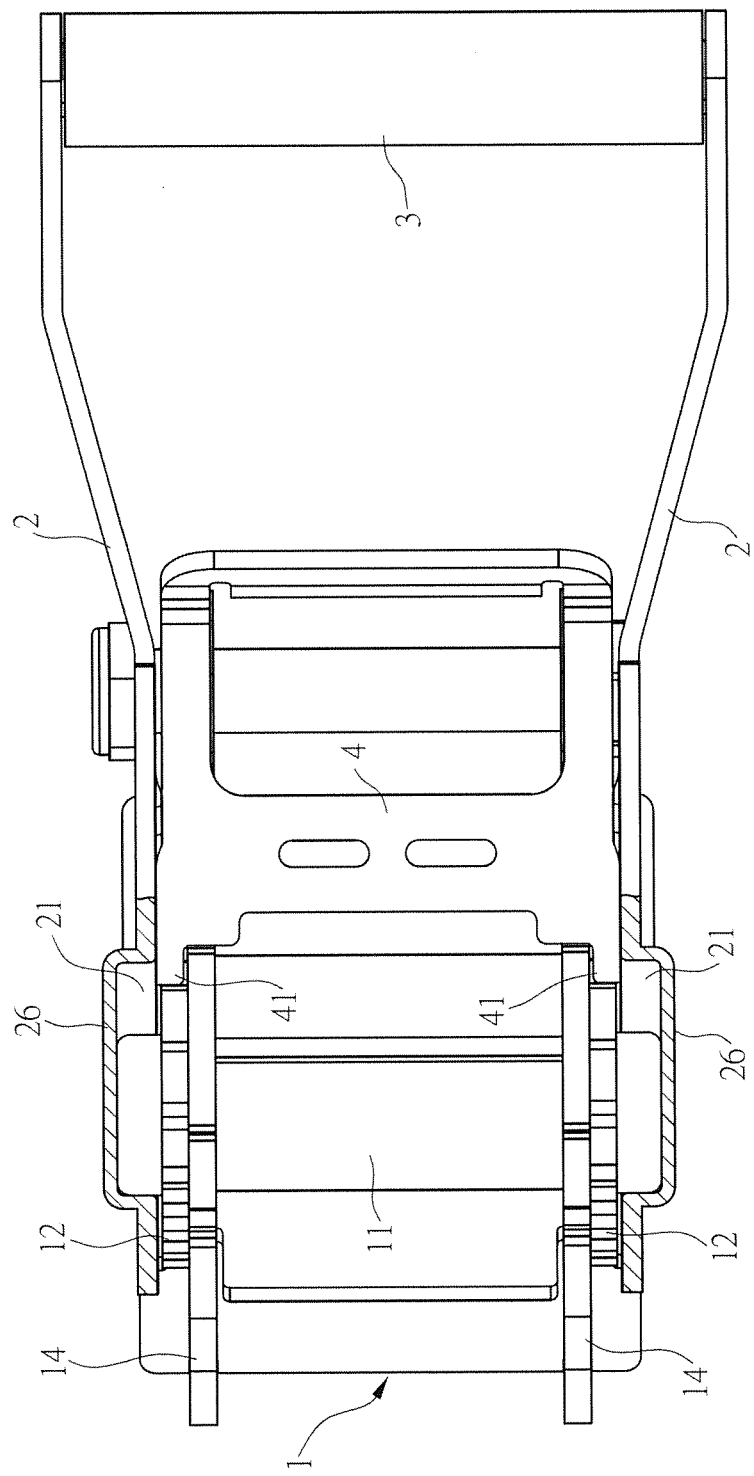
FIG. 13 is a schematic planar view of a blocking effect formed between both ends of a rotating shaft of a fixed frame and a housing of two first side panels in accordance with the third preferred embodiment of the present invention.

With reference to FIG. 12 for the third preferred embodiment of the present invention, each first side panel 2 has a housing 26 disposed on an outer side of the first side panel 2 and protruded from the periphery of the socketing hole 21, and the housing 26 at the outer side of the first side panel 2 covers the socketing hole 21, so that the structure of the housing 26 can enhance the structural strength of the first side panel 2 at the socketing hole 21. In FIG. 13, the housings 26 of the two side panels 2 are disposed at both ends of the rotating shaft 11 respectively, so that a blocking effect between the socketing holes of the two side panels 2 and both ends of the rotating shaft 11 can be achieved to prevent the two side panels 2 from being separated from the rotating shaft 11 accidentally.

In summation of the description above, the present invention improves over the prior art, and is thus duly filed for patent application. While the invention has been described by means of specific embodiments, numerous modifications and variations could be made thereto by those skilled in the art without departing from the scope and spirit of the invention set forth in the claims.

The invention claimed is:

1. A hand puller comprising:
   a fixed frame and a moving frame displaceably coupled to the fixed frame;
   an end of the fixed frame including a rotating shaft pivotally coupled thereto for winding a strap, the rotating shaft defining an axis and having a ratchet installed thereon, the fixed frame including a displaceable stop member for releasably engaging a ratchet gear of the ratchet, and the moving frame driving the rotating shaft to rotate in a first direction when the strap is wound,
   wherein the moving frame includes two opposed side panels, a handle and a fastening member, the handle being coupled to extend between the two side panels, and each of the two side panels releasably engaging the rotating shaft;
   each side panel forming an engaging surface extending about a socketing hole to a notch communicating with the socketing hole;
   the fastening member being installed between the handle and the socketing holes of the side panels and having pressing portions formed towards an edge of the socketing hole for displaceably engaging the ratchet gear, the fastening member being biased by an elastic member towards the ratchet gear of the ratchet;
   each socketing hole defining a diameter space greater than the shaft diameter of the rotating shaft, each notch defining a diameter space smaller than the diameter space of the socketing hole and greater than the shaft diameter of the rotating shaft;

wherein the moving frame is angularly displaceable about the axis of the rotating shaft between first and second positions relative to the fixed frame, the rotating shaft being displaced within the socketing holes in a direction transverse to the axis thereof during the angular displacement of the moving frame between the first and second positions.

2. The hand puller according to claim 1, wherein the two side panels of the moving frame are first side panels, and the fixed frame includes two second side panels, the rotating shaft being pivotally coupled to an end of the two second side panels, and the stop member being positioned between the two second side panels.

3. The hand puller according to claim 2, wherein each of the first side panels has a protrusion formed at an end of the socketing hole, and when the first side panels are swung to a position where the protrusion abuts the stop member to disengage the ratchet gear therefrom, each of the second side panels at a position corresponding to the pressing portions of the fastening member have a positioning groove for receiving the fastening member to thereby release the strap quickly.

4. The moving frame structure of a hand puller according to claim 2, wherein each of the first side panels has a housing disposed on the exterior of the first side panel, and the housing is protruded from the periphery of the socketing hole and covered onto the socketing hole on an outer side of the first side panel.

5. The hand puller according to claim 2, wherein the first side panels together with the pressing portions of the fastening member are displaceable between a position where they are embedded into the ratchet gear and a position where they are separated from the ratchet gear.

6. The moving frame structure of a hand puller according to claim 2, wherein the latching portion of the fastening member is normally embedded into the ratchet gear of the ratchet by an elastic force of the elastic member and a circular arc surface of the socketing hole abuts against the rotating shaft.

\* \* \* \* \*